Patented Oct. 20, 1936

2,057,733

UNITED STATES PATENT OFFICE 2,057,733

MANUFACTURE OF RUBBER-BONDED ABRASIVE ARTICLES

Royce J. Noble, Malden, Mass., assignor to Heveatex Corporation, Melrose, Mass., a corporation of Massachusetts No Drawing. Application October 5, 1935, Serial No. 43,718

10 Claims. (Cl. 51—278)

This invention relates to the manufacture of rubber-bonded abrasive articles of the character of grinding wheels. It involves, generally speaking, the mixing of abrasive grain such as carborundum, corundum, alundum, or the like, with a vulcanizable rubber composition in granular or pulverulent condition, the molding of the mixture into an abrasive article of the desired shape, and the vulcanization of the molded article.

According to one method of making abrasive articles, the abrasive grain is mixed with rubber, sulphur, and other rubber-compounding agents on a rubber mill. The mixture is then sheeted into the desired thickness, cut or dried out into such articles as grinding wheels, and the articles vulcanized. The operation of repeatedly passing the mixture of rubber and abrasive grain through the nip of the mixing rolls of the mill is not only wearing to the rolls but causes the grain to be crushed to such an extent that its average particle size is much lower than that of the original grain. This is a serious disadvantage when it is desired to produce abrasive articles with grain of predetermined comparatively large particle size. Again, there are limits to the amount of grain that can be mixed with rubber on a rubber mill, in consequence of which the ratio of rubber to grain may be greater than that leading to a finished article of the desired abrading effectiveness.

Another method of making abrasive articles consists in dissolving or swelling rubber with any one of the usual volatile rubber solvents, such as naphtha, mixing the grain with the resulting rubber solution or cement, forming the mixture into an article of the desired shape, and drying and vulcanizing the article. Not only does this method present a fire hazard and entail the loss of expensive solvent, but the last traces of solvent must be removed from the finished abrasive article in order to avoid such defects as soft spots and pockets such as are especially objectionable in grinding wheels.

In still another method, the abrasive grain is mixed with rubber latex compositions containing sulphur, fillers, and other rubber-compounding agents and the mixture then formed into the desired abrasive articles in much the same way as when rubber cement is used. While rubber latex permits of the desired mixing with low power consumption and no reduction in grain size, it is difficult to realize the desired strong bond between the rubber and the grain surfaces. It appears that the rubber deposited from latex, as by drying the latex-grain mixture, does not thoroughly envelop the abrasive particles or develop sufficiently strong bonding affinity for the grain surfaces even during vulcanization.

The method of the present invention permits of the ready realization of substantially uniform mixture of abrasive grain and rubber in inexpensive mixing equipment with a minimum expenditure of power and the preservation of the particle size of the grain in the mixture. Not only does my method require no rubber solvents, but it leads to an abrasive article wherein the valuable quality of substantial homogeneity is combined with tenacious bonding of the abrasive particles by such amount of rubber and, if desired, other bonding agent, as to ensure therein the required abrading effectiveness.

In carrying out my method, the abrasive grain is mixed with substantially unvulcanized rubber in pulverulent condition in the presence of vulcanizing ingredients and the mixture is molded and vulcanized under heat and pressure into an abrasive article of the desired shape, for instance, a grinding wheel. In order that the finished article possess appropriate strength, it is important that the pulverulent rubber be virgin, that is, not previously vulcanized, although it is possible to add thereto more or less ground reclaimed rubber or ground ebonite, depending upon the qualities sought in the finished article. The vulcanizing ingredients employed may include sulphur, zinc oxide, and vulcanization accelerator; and, if desired, pigments and fillers may be present in the mixture subjected to molding. The abrasive grain may be of a natural or synthetic character and be composed of various sized particles. Indeed, it may be preferable to employ a mixture of grains of two or more distinctly different average particle sizes so as to minimize spacing between particles and thereby increase the density of the finished article.

In some instances, I have found it distinctly desirable to coat the abrasive granules with a primary bonding agent in the form of a solution which facilitates the dissemination of the rubber powder throughout the grain. Such a bonding agent is preferably one which not only has strong bonding affinity for both the grain and the rubber but is capable of setting or hardening to a tough condition under such heat and pressure as may be employed in the vulcanization of the rubber. There are various polymerizable resins which answer the purpose of a primary bonding agent, for instance, the phenolic resins, the vinyl resins, etc. While synthetic resins, especially the phenolic resins, are preferred, other bonding agents, such as hemoglobin or equivalent proteinous substance, may serve the function of a primary bonding agent, since they effect a strong bond between the rubber and the grain and tend to acquire a tough condition under heat and pressure.

Once the abrasive grain has been coated with a solution of the primary bonding agent, it is then mixed with the pulverulent rubber in the presence of vulcanizing ingredients, the mixture molded into an article of the desired shape, and the article dried to eliminate such solvent vehicle as has been introduced into the article along with the primary bonding agent. I prefer to use primary bonding agent in an amount by weight not greater than about 5% of the abrasive grain, in which case, the drying period for the initially molded article, assuming that it is a grinding wheel, will be about 4 to 6 hours, depending upon the thickness of the wheel and the amount and kind of solvent employed for the primary bonding agent. The dried molded article is then remolded under heat and substantial pressure so as to cause the rubber particles to unite strongly and thus to bond the abrasive particles together while vulcanization is taking place.

One procedure embodying my invention and including the initial coating of the abrasive granules may be performed substantially as follows. To 100 parts of suitable abrasive grain, such as that hereinbefore mentioned is added 10 parts of a 50% solution of phenolic resin capable of polymerizing further to a tough condition under heat. The solution and grain may be placed in a rotary drum and tumbled until the surfaces of the grains are uniformly wetted or coated with the solution. To the wetted grain is then added 10 to 20 parts of a pulverulent rubber composition containing rubber and sulphur in the ratio of 100 parts of rubber to 40 parts of sulphur and containing a relatively small amount of a suitable accelerator of vulcanization. This mixture is stirred or tumbled until the rubber powder is substantially uniformly disseminated throughout the mass of wet abrasive grains, whereupon the mixture is placed in a mold for shaping into the desired article, say, a grinding wheel. The mixture is molded under pressure and thus compacted to the desired degree. The resulting molded article, say, a grinding wheel blank, is then removed from the mold and dried at a temperature of, say, about 80° to 100° C., for about 4 to 5 hours to evaporate substantially completely the solvent introduced along with the phenolic resin into the blank. The blank is now ready to be vulcanized, which operation may consist in re-molding the blank under pressure for about 7 hours at a temperature corresponding to 80-pounds steam pressure. The resulting article is one wherein the resin has been further polymerized or hardened to a tough condition and wherein the rubber particles have been unified into a tough vulcanized mass serving to bond together the phenol-coated abrasive granules with high tenacity.

While various kinds of rubber in granulated or pulverulent condition may be employed in my method, I prefer to use pulverulent rubber prepared in accordance with the practice of my application Serial No. 706,858, filed January 16, 1934, now Patent No. 2,019,055, dated October 29, 1935. Such pulverulent rubber is characterized by its derivation directly from rubber latex and, accordingly, its virgin, substantially unvulcanized condition. A rubber composition prepared as disclosed in that application and useful for the purpose of the present invention may comprise 100 parts of rubber to 30 to 40 parts of sulphur. It may also contain a relatively small amount of vulcanization accelerator and fillers, pigments, or other rubber-compounding agents. As further pointed out in that application, the pulverulent rubber may be derived from a substantially uncompounded rubber latex and the desired amount of sulphur, vulcanization accelerator, etc., may be mixed with the pulverulent rubber.

It is possible to deviate from the particular procedure hereinbefore outlined. Thus, the mixture prepared for molding as hereinbefore described may be initially molded and dried and the dried blank remolded at a temperature of, say, about 300° F. to cause the rubber particles to cohere. Pressure may then be exerted on the molded article to effect the desired packing of the grain therein and to impart thereto such density as ensures a finished article of the appropriate strength and toughness. The re-molding of the blank at elevated temperature and under pressure may be carried on for a period of time to effect only partial vulcanization of the rubber, whereupon the blank may be removed from the mold and placed in a baking oven wherein it is maintained at an elevated temperature and for a period of time sufficient to complete vulcanization.

I claim:—

1. A method of making rubber-bonded abrasive products which comprises mixing as separate entities or particles abrasive grain with substantially unvulcanized pulverulent rubber, molding the mixture under pressure into a unitary mass of the desired shape, and vulcanizing the molded mass.

2. A method of making rubber-bonded abrasive products which comprises mixing as separate entities or particles abrasive grain with substantially unvulcanized pulverulent rubber as derived directly from rubber latex in the presence of added vulcanizing ingredients and molding the mixture under heat and pressure into a unitary vulcanized mass of the desired shape.

3. A method of making rubber-bonded abrasive products which comprises enveloping abrasive grain with an agent having strong bonding affinity for both said grain and rubber, mixing the grain with substantially unvulcanized pulverulent rubber, molding the mixture into an article of the desired shape, and vulcanizing the molded article.

4. A method of making rubber-bonded abrasive products which comprises wetting abrasive grain with a solution of an agent capable of hardening to a tough condition under heat and having strong bonding affinity for both said grain and rubber, mixing the grain with substantially unvulcanized pulverulent rubber in the presence of added vulcanizing ingredients, molding the mixture into an article of the desired shape, drying the article and vulcanizing it under heat and pressure.

5. A method of making rubber-bonded abrasive products which comprises wetting abrasive grain with a solution of a synthetic resin capable of polymerizing and hardening to a tough condition under heat and having strong bonding affinity for both said grain and rubber, mixing the grain with substantially unvulcanized pulverulent rubber as derived directly from latex in the presence of added vulcanizing ingredients, molding the mixture into an article of the desired shape, drying the article, and vulcanizing it under heat and pressure.

6. An abrasive product comprising a mass of abrasive grain bonded by rubber in vulcanized condition, said grain surfaces being substantially uniformly coated with an agent having strong bonding affinity for both said grain and rubber.

7. An abrasive product comprising a mass of abrasive grain bonded by rubber in vulcanized condition, said grain surfaces being substantially uniformly coated with a heat-polymerized agent having strong bonding affinity for both said grain and rubber.

8. An abrasive product comprising a mass of abrasive grain bonded by rubber in vulcanized condition, said grain surfaces being substantially uniformly coated with a heat-polymerized synthetic resin having strong bonding affinity for both said grain and rubber.

9. A method of making rubber-bonded abrasive products which comprises mixing as separate entities or particles abrasive particles with rubber particles capable of being caused to cohere under pressure and molding the mixture under sufficient pressure to cause said rubber particles to cohere and thus to bond the abrasive particles into a unitary mass.

10. A method of making rubber-bonded abrasive products which comprises mixing as separate entities or particles abrasive grain with vulcanizable pulverulent rubber containing added vulcanizing ingredients to produce a substantially uniform mixture and molding and vulcanizing the mixture to form a vulcanized unitary mass of the desired shape.

ROYCE J. NOBLE.